Sept. 22, 1959     T. E. LOHR ET AL     2,905,012
MECHANICAL MOVEMENT DEVICE
Filed Dec. 10, 1957                                    2 Sheets-Sheet 1
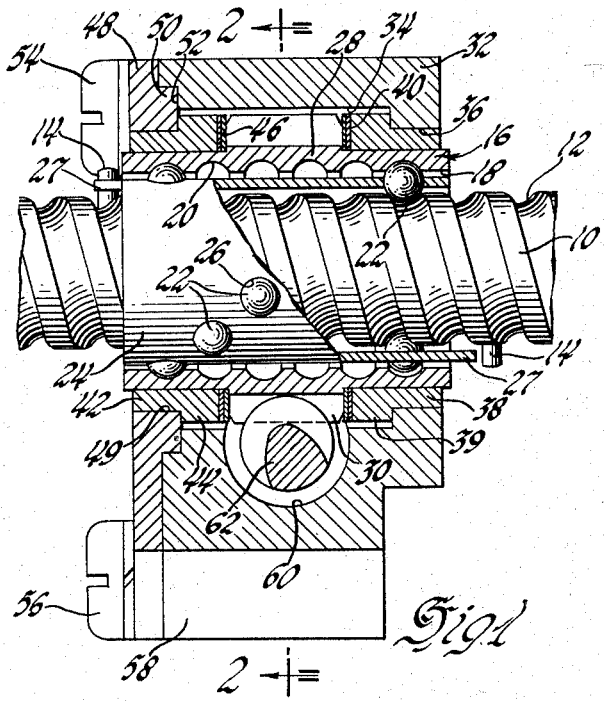
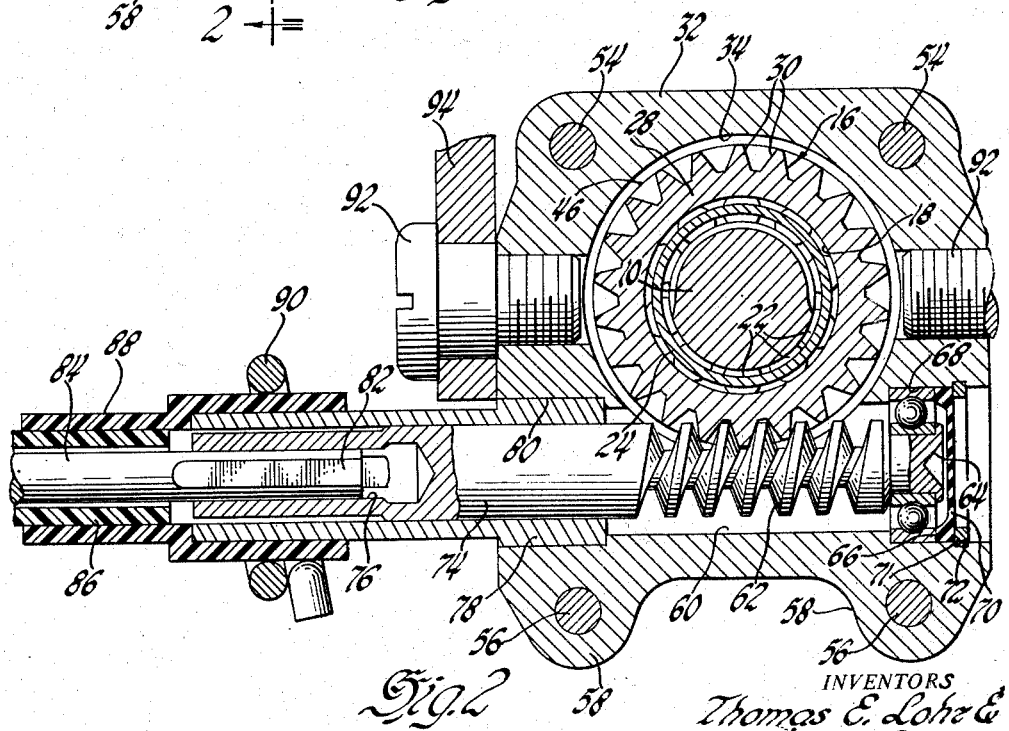
INVENTORS
Thomas E. Lohr &
BY George W. Sierant
W. S. Pettigrew
ATTORNEY

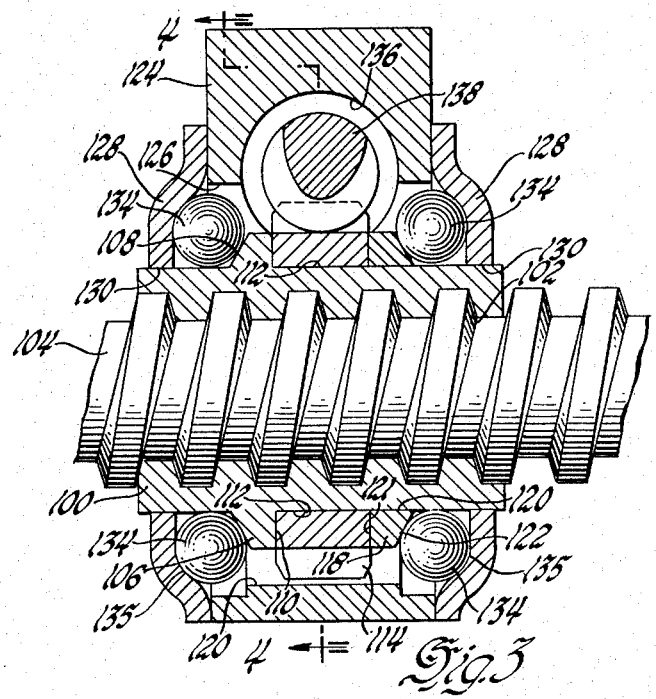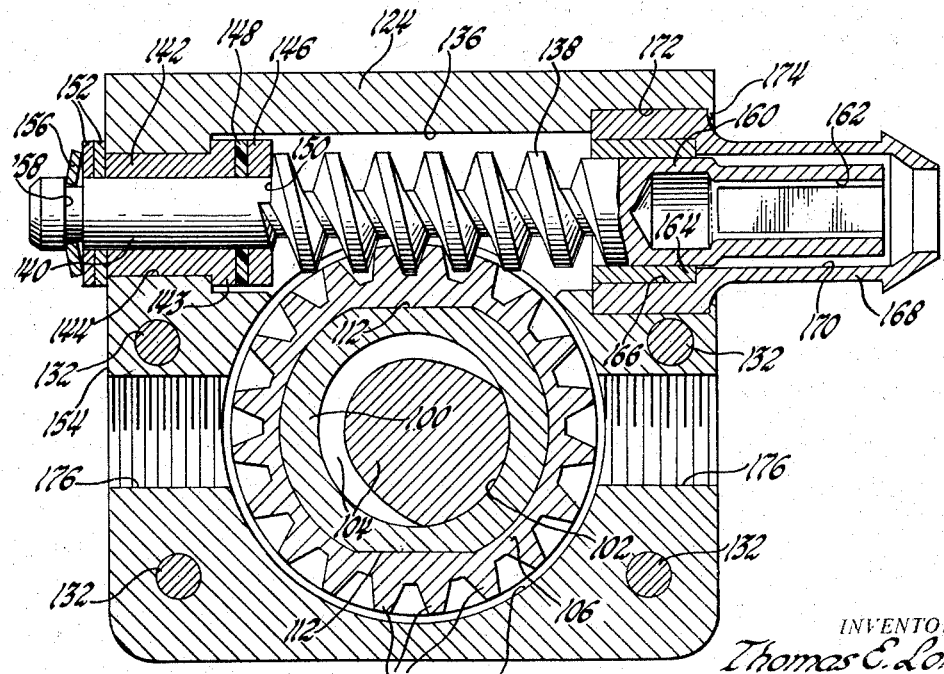

United States Patent Office 2,905,012
Patented Sept. 22, 1959

2,905,012

MECHANICAL MOVEMENT DEVICE

Thomas E. Lohr and George W. Sierant, Detroit, Mich., assignors to General Motors Corporation, Detroit, Mich., a corporation of Delaware Application December 10, 1957, Serial No. 701,924

4 Claims. (Cl. 74—424.8)

This invention relates to mechanical movement devices and more particularly to screw and nut actuators.

The screw and nut actuators of this invention generally include a helically threaded lead screw fixed against rotation and axial movement and a nut threadedly mounted on the lead screw for axial movement therealong. The nut includes a worm wheel which is rotatably received within a non-rotatable housing rotatably supported on the nut by bearing means which transmit axial thrust from the nut to the housing. The housing mounts a driving worm which meshes with the worm wheel whereby the worm rotates the worm wheel and the nut to cause the nut and housing to move axially along the lead screw. Thus, the nut mounts the gear reduction driving means and this allows the nut to be located remote from the motor or power actuator which drives the worm.

The primary object of this invention is to provide an improved screw and nut actuator. Another object of this invention is to provide an improved screw and nut actuator which includes a fixed lead screw member and a nut threadedly mounted on the lead screw member for axial movement therealong upon relative rotation therebetween, with the nut mounting the gear reduction driving means for rotational movement thereof. A further object of this invention is to provide an improved screw and nut actuator which includes a fixed lead screw member, a nut threadedly mounted on the lead screw member for axial movement therealong, and a non-rotatable housing rotatably supported on the nut by bearing means which transmit axial thrust from the nut to the housing, with the nut and housing mounting gear reduction driving means for rotational movement of the nut relative to the lead screw whereby the nut and housing move axially thereof.

These and other objects of this invention will be readily apparent from the following specification and drawings, wherein:

Figure 1 is a partial axial sectional view of a screw and nut actuator according to one preferred embodiment of this invention;

Figure 2 is a sectional view taken on the plane indicated by line 2—2 of Figure 1;

Figure 3 is an axial sectional view of a screw and nut actuator according to another preferred embodiment of this invention; and Figure 4 is a sectional view taken on the plane indicated by line 4—4 of Figure 3.

Referring now particularly to Figures 1 and 2 of the drawings, a screw and nut actuator according to one preferred embodiment of this invention will be described. A lead screw member 10 is provided with a helical groove 12 and a pair of pins 14 which are spaced axially of the lead screw member for a purpose to be hereinafter described. Although not shown in the drawings, the lead screw member 10 is fixed with respect to a fixed support whereby the member 10 is fixed against rotation and axial movement.

An annular nut member 16 includes an axial bore 18 which receives the lead screw member 10 and is provided with a plurality of axially spaced circumferential grooves 20. A plurality of ball bearings 22 seat in the helical groove 12 of the lead screw member and also within one of the circumferential grooves 20 of the nut member with the balls being located by an annular tube or cage 24 which is located between the nut member and the lead screw member and is provided with circular openings 26 which freely receive the ball bearings 22. The cage 24 is provided with an axially extending lug 27 at either end thereof which cooperates with pins 14 in a manner to be described. As can be seen in Figure 1 of the drawings, the nut member 16 is provided with a rather thick annular flange 28 intermediate the ends thereof with the outer peripheral surface of this flange being provided with helical gear teeth 30 whereby the flange 28 provides a worm wheel.

A housing 32 surrounds the nut member 16 and is provided with an annular bore 34 opening at one end thereof to a bore 36 of smaller diameter. A flanged bushing 38 is slidably received on one end of the nut member 16 and fits between the nut member and the bore 36 of housing 32 to rotatably support one end of the housing on the nut member. The flange 39 of the bushing engages the shoulder between bores 34 and 36 and also engages a pair of spring thrust washers 40 located between the flange 39 and one side of the flange 28 of the nut member to axially locate the housing on the nut member. A flanged bushing 42 is slidably received on the other end of the nut 16 and the flange 44 of this bushing engages a pair of spring thrust washers 46 which are located between the flange and the other side of the annular flange 28 of the nut member. A cover plate 48 includes a central opening 49 slidably receiving bushing 42 and an annular axially extending flange 50 which fits within a groove 52 on the other end of housing 32 and also engages flange 44 of bushing 42 to rotatably support and axially locate the other end of the housing on the nut member. The cover plate and housing 32 are secured together by pairs of bolts 54 and 56, with bolts 56 being threadedly received by lugs 58 of housing 32.

Referring now to Figure 2 of the drawings, the housing 32 is further provided with a bore 60 which opens to bore 34 and is located transversely thereof. A worm 62 received within bore 60 meshes with gear teeth 30, with one end shaft 64 of the worm being secured to the inner race of a thrust bearing 66 by peening the end of the shaft over the inner race of the bearing. The outer race of the bearing is received within a bore 68 of larger diameter than bore 60 and seats against the shoulder between these bores. A nylon cap 70 seats against the outer race of the thrust bearing and is secured in place by a split ring 71 which snaps within a groove 72 provided in bore 68. The other end shaft 74 of worm 62 is provided with a square-shaped bore 76 and is rotatably supported within housing 32 by a bushing 78. The inner end of the bushing fits within a bore 80 of larger diameter than bore 60 and engages the shoulder between these bores. The square-shaped bore 76 of shaft 74 receives the square-shaped end 82 of a flexible drive cable 84. Although not shown in the drawings, it will be understood that the drive cable is secured in a suitable manner to an electric motor so as to be rotatably driven thereby and rotate the worm 62 upon rotation of the motor. Cable 84 is provided with a protective plastic sheath 86 and a shouldered plastic cap 88 fits over the end of sheath 86 and the outer end of the bushing 78, with the cap being secured in place by a spring clamping ring 90.

In order that the housing 32 be non-rotatable and also operate a member to be operated, not shown, opposite sides of the housing are bolted at 92 to arms 94, only one of which is shown. It will be understood that the arms 94 are secured in a suitable manner to the member to be operated whereby axial movement of the nut 16 and housing 32 along the lead screw operate this member.

The operation of the screw and nut actuator shown in Figures 1 and 2 of the drawings will now be described. Upon operation of the electric motor to rotate the drive cable 84, the worm 62 will be rotated to rotate the nut 16 through the meshing engagement of the worm with the helical teeth 30 on the flange 28 of the nut. As the nut rotates, the cage 24 and ball bearings 22 rotate with the nut whereby the nut and housing 32 move axially along the lead screw member 10 as the ball bearings 22 follow the helical groove 12 of the lead screw member, with the direction of axial movement of the nut and housing being controlled by the direction of rotation of the electric motor. Since the housing 32 is secured against rotation by means of the arms 94, the annular flange 28 of the nut will rotate relative to the flanges 39 and 44 of the bushings 38 and 42. The axial thrust of the flange 28 will be selectively and alternately transmitted to flange 39 or 44 through the spring washers 40 or 46, whereby the housing 32 will axially move along the lead screw with the nut. Thus, the bushings 38 and 42 and the thrust washers 40 and 46 act as bearing means to transmit the axial thrust of the nut member to the housing.

As the nut moves axially along the lead screw in either direction, it will be seen that one of the lugs 27 of the cage 24 will engage one of the pins 14 secured to the lead screw member 10, as previously described. When one of these lugs engages a pin 14, the cage 24 is secured to the lead screw member 10 and therefore the ball bearings 22 will no longer move axially along the helical groove 12 of the lead screw member but will move within the circumferential grooves 20 of the nut member as the nut member rotates relative to the ball bearings, the cage 24 and the lead screw member 10. Thus, axial movement of the nut along the lead screw member can be controlled within predetermined limits through the spacing of the pins 14 on the lead screw member 10. It will be understood, of course, that as long as the angle or pitch of the helical groove 12 does not exceed the angle of friction between the ball bearings 22 and the lead screw member 10 and nut member 16, the drive will be positive without any slippage.

Should the nut member 16 encounter a torque overload, such as by binding of the member to be operated whereby the nut can no longer move axially along the lead screw member, the ball bearings 22 will stop their movement along the helical groove 12 of the lead screw member 10 and remain stationary with the cage 24 as the nut member 16 moves relative to the ball bearings whereby the ball bearings move in the circumferential grooves 20 of the nut member.

By providing a nut member of this type which mounts gear reduction driving means in combination with the non-rotatable housing, the nut member can be located at some distance with respect to the electric motor or other driving force and yet adequately perform its function of operating the member to be operated. The assembly is compact and requires a minimum amount of space, and this feature is very desirable in certain installations, such as seat adjuster structures, where space is at a premium.

Referring now particularly to Figures 3 and 4 of the drawings, a screw and nut actuator according to another preferred embodiment of this invention will be described. An annular nut member 100 is provided with an internal helically threaded bore 102 which threadedly receives a helical threaded lead screw member 104 which is fixed against rotation and axial movement as lead screw member 10. The nut is provided with a radially outwardly extending annular flange 106, with one side 108 of this flange being annularly tapered and the other side 110 of the flange being radially flat. As best shown in Figure 4 of the drawings, the outer surface of the nut between the side 110 of the flange 106 and the right hand end of the nut is provided with opposite flat sides 112. A worm wheel 114 is provided with a central opening which is complementary to the shape of the outer surface of the nut and is slidably and non-rotatably received thereon in engagement with the other side 110 of flange 106 to drivingly couple the worm wheel to the nut. An annular ring 118 is provided with a central opening 120 of the shape of the outer surface of the nut 100 and is slidably and non-rotatably received therein, with the radially flat side 121 of the ring in engagement with the worm wheel 114 to hold the worm wheel in engagement with the one side 110 of flange 106. The other side 122 of ring 118 is annularly tapered and corresponds to the tapered side 108 of flange 106 although facing oppositely with respect thereto.

A generally square-shaped housing 124 is provided with a bore 126 which receives the nut member 100 and the worm wheel 114. Opposite end plates 128 are provided with central openings 130 to slidably receive opposite ends of the nut 100, with the plates 128 being bolted to the housing 124 at 132, Figure 4. An annular ring of ball bearings 134 is provided between the annular arcuately shaped shoulder 135 of each of the end plates and the tapered sides 108 and 122 of flange 106 and ring 118, respectively, to rotatably support the housing 124 on the nut member 100 and also to provide thrust bearings between the nut member and the housing 124.

As best shown in Figure 4 of the drawings, housing 124 is provided with a bore 136 which opens to bore 126 and is located transversely thereof. A worm 138 received within bore 136 meshes with worm wheel 114 to drive the worm wheel and nut 100 upon rotation of the worm. One end shaft 140 of the worm is received within a bushing 142 having a flange 143 which seats against the shoulder between bore 136 and a bore 144 of smaller diameter to axially locate the bushing. A metal washer 146 and a Teflon washer 148 fit between the flange 143 of the bushing and a shoulder 150 of the worm, with the washers being held in tight engagement with the flange and shoulder by a pair of washers 152 which are slidably received on the end shaft 140 and are held in engagement with one of the side edges 154 of housing 124 by a split Belleville spring washer 156 fitting within a groove 158 of the end shaft.

The other end shaft 160 of worm 138 has a square-shaped bore 162 and is rotatably mounted within a bushing 164. Bushing 164 is received within a bore 166 of a bushing 168 in engagement with a shoulder between bore 166 and a bore 170 of smaller diameter. Bushing 168 is received within a bore 172 of larger diameter than bore 136, with the bushing seating against the shoulder provided by the bores 136 and 172 and being secured in place by peening over the edge portion 174 of bore 172 after assembly. Although not shown in the drawings, it will be understood that a drive cable which is the same as the drive cable 84 is provided with a square-shaped end which is received within the square-shaped bore 162 of shaft 160 to thereby drivingly couple the worm 138 to the electric motor which drives the worm through the drive cable.

As can be seen best in Figure 4 of the drawings, the housing 124 is provided with a pair of opposite threaded bores 176. These bores are adapted to receive bolts which are similar to the bolts 92 to secure the housing to a member to be operated through arms similar to arms 94 whereby the housing 124 is non-rotatable but can move axially of the lead screw 104 upon rotation of the worm 138 and worm wheel 114 to thereby operate the member to be operated.

It can be seen that upon rotation of the worm 138, the worm wheel 114 will also be rotated to rotate the nut whereby the nut will move axially along the fixed lead screw member 104. As the nut moves axially along the lead screw member, the axial thrust of the nut will be transmitted to the housing 124 through one of the annular rows of ball bearings 134 and one of the end plates 128 whereby the housing will move axially with the nut.

It will be noted that the screw and nut actuator shown in Figures 3 and 4 of the drawings is very compact and includes a minimum number of parts. The worm wheel which drives the nut is secured thereto and the nut rotatably supports the housing which mounts the driving worm by means of a thrust bearing arrangement. Again, this embodiment of the invention offers the advantages of allowing the nut and housing assembly to be placed at some distance from the electric motor or other driving means since the nut mounts the gear reduction driving means.

Thus, this invention provides improved screw and nut actuators which includes a fixed lead screw member and a nut threadedly mounted on the lead screw member for axial movement therealong upon relative rotational movement therebetween, with the nut mounting the gear reduction driving means for rotational movement thereof whereby the nut can be placed at some distance from the motor or other power actuator and yet adequately perfrom its function of operating a member to be operated.

We claim:

1. A mechanical movement device comprising, a fixed lead screw, an annular nut member threadedly mounted on said lead screw and including an annular radially outwardly extending portion intermediate the ends thereof having a toothed outer periphery and opposite sides providing axially facing bearing surfaces, a non-rotatable housing having a bore therein of a size to receive said nut member and said radially outwardly extending portion thereof, cover plates secured to opposite sides of said housing over the opposite ends of said bore and having openings therein of a size to receive opposite ends of said nut member therethrough, bearing surfaces formed in said plates, thrust bearing means located between said bearing surfaces of said plates and said bearing surfaces of said annular portion of said nut member to transmit axial thrust loads from said nut member to said housing and to axially locate said nut member within said housing, and a drive gear rotatably supported within said housing and meshing with said toothed outer periphery of said annular portion of said nut member to thereby rotate said nut member and move said nut member and housing axially along said lead screw member.

2. A mechanical movement device comprising, a fixed lead screw, an annular nut member threadedly mounted on said lead screw and including an annular radially outwardly extending portion intermediate the ends thereof having a toothed outer periphery and opposite radially flaring sides providing axially facing thrust bearing surfaces, a non-rotatable housing having a bore therein of a size to receive said nut member and said radially outwardly extending portion thereof, cover plates secured to opposite sides of said housing over the opposite ends of said bore and having openings therein of a size to receive opposite ends of said nut member therethrough, an annular groove provided in each of said plates opening to a respective radially flaring bearing surface, a plurality of ball bearings located between said flaring bearing surfaces and each of said annular grooves of said cover plates to transmit axial thrust loads from said nut member to said housing and to axially locate said nut member within said housing, and a drive gear rotatably supported within said housing and meshing with said toothed outer periphery of said annular portion of said nut member to thereby rotate said nut member and move said nut member and housing axially along said lead screw member.

3. A mechanical movement device comprising, a fixed lead screw, a nut member threadedly mounted on said lead screw and including an annular radially outwardly extending portion intermediate the ends thereof having a toothed outer periphery and spaced axially facing thrust bearing surfaces, a non-rotatable housing surrounding said nut member and including a first bore of a size to receive said annular portion of said nut member and a spaced pair of radially inwardly extending annular flanges located in axially spaced opposed relationship to a respective one of said thrust bearing surfaces and defining openings of a size to receive a respective end of said nut member therethrough, thrust bearing means located between a respective one of said bearing surfaces and a respective one of said flanges to locate said nut member within said housing and to transmit axial thrust loads from said nut member to said housing, said housing further including a second bore therein located transverse of said first bore and opening thereto, and a drive worm gear rotatably received within said second bore and having one end thereof adapted for connection to power operated means, and thrust bearing means located between the other end of said worm gear and said housing.

4. A mechanical movement device comprising, a fixed lead screw member, a nut member threadedly mounted on said lead screw member for axial movement therealong upon relative rotational movement therebetween, said nut member including an annular radially outwardly extending portion provided with a toothed outer periphery, a housing enclosing said nut member and annular portion, thrust bearing means rotatably mounting said nut member within said housing to axially locate said nut member therewithin and transmit axial thrust loads from said nut member to said housing, a drive gear rotatably supported within said housing and meshing with said toothed outer periphery of said annular portion of said nut member to thereby rotate said nut member and move said nut member and housing axially along said lead screw member, linkage means adapted to interconnect said housing and a mechanism to be moved with respect to said fixed lead screw member to restrain said housing against rotational movement, and flexible drive means operatively connected to said drive gear to rotate said drive gear and thereby move said nut member and housing axially along said lead screw member to move the mechanism relative thereto by means of said linkage means.

References Cited in the file of this patent

UNITED STATES PATENTS

| | | |
|---|---|---|
| 1,407,160 | Klausmeyer | Feb. 21, 1922 |
| 1,751,139 | Feinstein | Mar. 18, 1930 |
| 2,054,760 | Oberhoffken | Sept. 15, 1936 |
| 2,452,428 | Bryant | Oct. 26, 1948 |
| 2,768,532 | Russell | Oct. 30, 1956 |